July 15, 1969  YASUO AKAO ET AL  3,456,185

WIDE FREQUENCY RANGE SCANNING MICROWAVE GAS SPECTROMETER

Filed Nov. 18, 1965  3 Sheets-Sheet 1

United States Patent Office 3,456,185
Patented July 15, 1969

3,456,185
WIDE FREQUENCY RANGE SCANNING MICROWAVE GAS SPECTROMETER
Yasuo Akao, 10–3 Mosanishi, Chigusacho, Chigusa-ku, and Shuzo Hattori, 22 2-chome, Sonoyamacho, Chigusa-ku, both of Nagoya, Japan
Filed Nov. 18, 1965, Ser. No. 508,466
Claims priority, application Japan, Nov. 18, 1964, 39/64,794
Int. Cl. G01n 23/10
U.S. Cl. 324—58.5
3 Claims

ABSTRACT OF THE DISCLOSURE

A wide frequency range scanning microwave gas spectrometer including a device for causing the tuning frequency of a cavity containing absorption cell to be varied mechanically and a device for making the frequency of a sweep microwave oscillator correctly follow the tuning frequency of the cavity so as to be able to observe the absorption of the molecules in a wide range.

---

This invention relates to microwave (including milliwave) gas spectrometers for investigating molecular structures and the performances of atoms forming the molecules by observing the absorption of the rotational spectra of gas molecules and also to sample cells to be used in such gas spectrometers.

According to the theory of quantum electronics, if an electromagnetic wave is applied to a molecule, due to an electric or magnetic dipole moment of the molecule, the molecule will be excited and will be transited to an upper energy level.

The frequency $\nu$ of the electromagnetic wave absorbed in such case (which shall be known as the absorption frequency hereinafter) will satisfy the formula $$\Delta E = h\nu \qquad (1)$$

wherein $\Delta E$ is an energy level difference causing the transition and $h$ is Plank's constant. In the case of a linear molecule, the absorption frequency by the transition of $J \rightarrow J+1$ will be $$\nu = 2 \times \frac{h}{8\pi^2 I}(J+1) \qquad (2)$$

wherein $I$ is a moment of inertia of the molecule around the axis and $J$ is a quantum number giving an angular momentum.

The absorption spectrum of a molecule will range from a microwave region to extreme infra-red rays for a small value of the angular momentum $J$. For example, with $Br_{79}C_{12}N_{14}$, in case the quantum number $J$ giving an angular momentum is transited from 5 to 6, the absorption frequency $\nu$ will be 49,356 mc./s.

From the observation of such absorption spectrum of the molecule can be obtained such knowledge of the molecular structure as the moment of inertia of the molecule or, in other words, the masses, bonding arm lengths and bonding angles of individual atoms.

As devices for observing microwave absorption spectra, there are already known a wave guide type spectrometer and a cavity resonator type spectrometer. In the former, a long wave guide tube is used as an absorption cell to contain a sample in order to elevate the detector sensitivity of absorption spectra, therefore it is difficult to change the kind of the gas and to vary the temperature and such handling as cleaning has not been simple. It is also difficult in the latter to vary the resonance frequency in a wide range so that it has not been practiced much.

Further, in the gas container used in the conventional microwave gas spectrometer, as the sample gas is enclosed directly in the wave guide or the cavity resonator, there are great difficulties in that the adsorption of the sample gas in the wall of said wave guide or cavity resonator will not be small and it will not be easy to take out the gas by heating in the case of replacing the sample gas and further it has not been easy to observe the variation of the absorption spectrum of the sample gas by varying such external conditions as the light, electric field, magnetic field and radioactive rays.

Therefore, an object of the present invention is to provide a gas spectrometer wherein is used a Fabry Perot type cavity resonator so that the change of the kind of the gas and cleaning may be simple and the resonance frequency may be varied in a wide range.

A further object of the present invention is to provide a gas spectrometer cell wherein it is easy to replace the sample gas and it is made easy to observe the variation of the absorption spectrum of the sample gas by varying such external conditions as the light, electric field, magnetic field and radioactive rays.

In the accompanying drawings.

Figure 1:
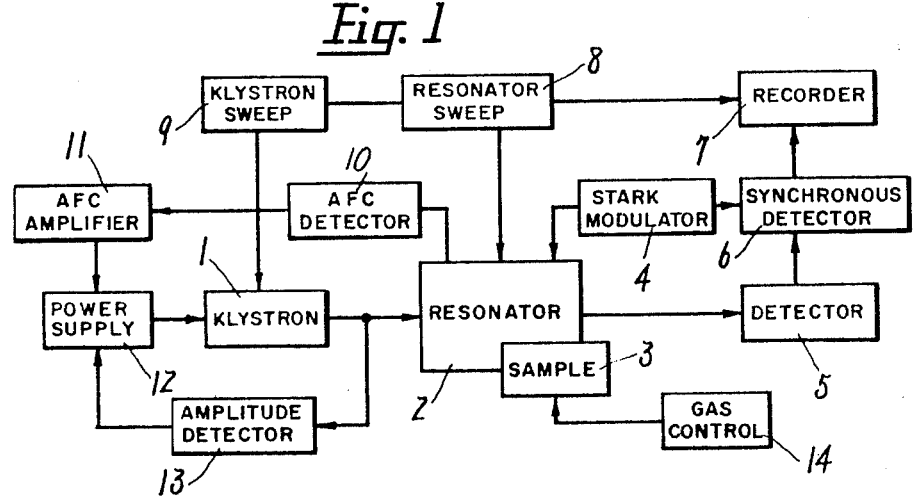
FIGURE 1 is a block diagram showing an apparatus embodying the present invention.

In FIGURE 1 which is a block diagram of a microwave gas spectrometer showing the first embodiment of the present invention, the output of a klystron sweep oscillator 1 (which shall be known as the klystron hereinafter) is stabilized as described later and continuously oscillates over a wide range and its oscillation frequency is stopped or swept at a set value made to follow the resonance frequency of a Fabry-Perot type standard cavity resonator 2 (which shall be known as the Fabry-Perot resonator hereinafter). When the oscillation frequency of the klystron coincides with the absorption frequency of the sample gas enclosed in the sample cell 3, apparently the loss Q of the Fabry-Perot resonator 2 will vary and the output of the Fabry-Perot resonator 2 will increase or decrease in response to said loss Q. Further, when the sample gas is Stark-modulated from a Stark modulating power supply 4, the absorption frequency of said sample gas will fluctuate. Therefore, the output of the Fabry-Perot resonator 2 is a microwave having as an envelope an alternating current corresponding to the gradient of the variation of said loss Q.

Said alternating current is taken out with a wide range microwave detector 5 so as to be an absorption signal, is synchronously detected and amplified in a synchronously detecting low frequency amplifier 6 controlled with the Stark modulating power supply 4 so as to be a signal of a substantially differential wave form (which shall be known as the differential signal hereinafter) of the absorption spectrum and is made an input on one side of recorder 7. Said recorder 7 has a sweep signal of a standard cavity sweeping mechanism 8 as an input on the other side so as to describe the differential wave form of the absorption spectrum.

The standard cavity sweeping mechanism 8 is operatively connected with a klystron sweeping mechanism 9 so that the standard cavity sweeping mechanism 8 may sweep the resonance frequency of the Fabry-Perot resonator 2, the klystron sweeping mechanism 9 may sweep the oscillation frequency of the klystron 1 and the resonance frequency and oscillation frequency may coincide with each other.

However, with only the above mentioned mechanisms, some difference between the resonance frequency and oscillation frequency will be unavoidable. The frequency of the klystron sweep oscillator 1 is modulated in advance. The signal corresponding to said difference is taken out with a frequency difference detector 10, is amplified through a frequency controlling amplifier 11 and is then added to a klystron power supply 12 so that the oscillation frequency of the klystron may be controlled to correctly follow the resonance frequency of said Fabry-Perot resonator 2. Further, when the microwave output of the klystron is observed with a power monitor controlling amplifier 13 so as to control the klystron power supply, it will be kept at a constant output level. A gas controlling unit 14 serves to control the sensitivity so as to be maximum by changing the kind of the gas contained in the sample cell and varying the gas pressure.

Figure 2:
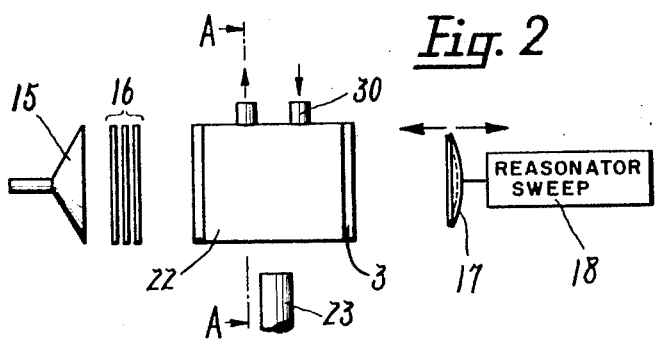
FIGURE 2 is a diagrammatic illustration of a Fabry Perot type standard cavity resonator equipped with a sample cell according to the present invention.

In FIGURE 2 which is a diagrammatic illustration of a Febry-Perot type standard cavity resonator equipped with a sample cell and to be used in the above mentioned embodiment, 15 is a horn antenna connected to a magic tee circuit or the like so as to lead a microwave input from the klystron and to take out a microwave output, 16 represents coupling plates forming a resonance circuit so as to reflect the greater part of the microwave input from the horn antenna 15 and to pass a part of it, 3 is a sample cell to enclose a sample gas, 17 is a reflector forming a resonance circuit together with said coupling plates 16 and 18 is a connecting part which is connected with the standard cavity sweeping mechanism 8 so as to sweep the resonance frequency by moving the reflector 17 rightward and leftward and has a directly read built in microwave counter. Said coupling plates are several glass plates arranged in parallel with a spacer interposed between them.

As described above, when the frequency of the microwave input and the absorption frequency of the sample gas coincide with each other, the loss Q of the Fabry-Perot resonator will vary and the reflection of the microwave will increase or decrease with said loss Q.

As the sample gas is Stark-modulated with Stark electrodes 22 and 22' (FIG. 5), the reflection of said microwave will have an envelope corresponding to the gradient of the variation of the loss Q of the Fabry-Perot resonator by the sample gas. This envelope is taken out as an absorption signal with the wide range microwave detector 5 shown in FIGURE 1.

Figure 3:
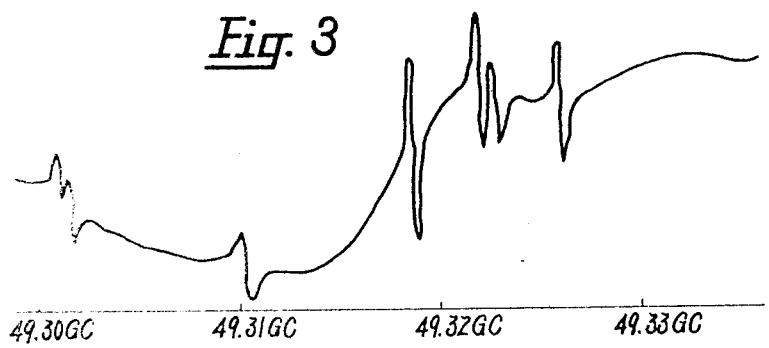
FIGURE 3 is a graphical example of recorded results obtained from the embodiment shown in FIGURE 1.

In FIG. 3 showing a recorded result of an absorption spectrum of $Br_{79}C_{12}N_{14}$ obtained from the embodiment shown in FIGURE 1, how the quantum number J showing the angular momentum is transited from 5 to 6 is shown.

Figure 4:
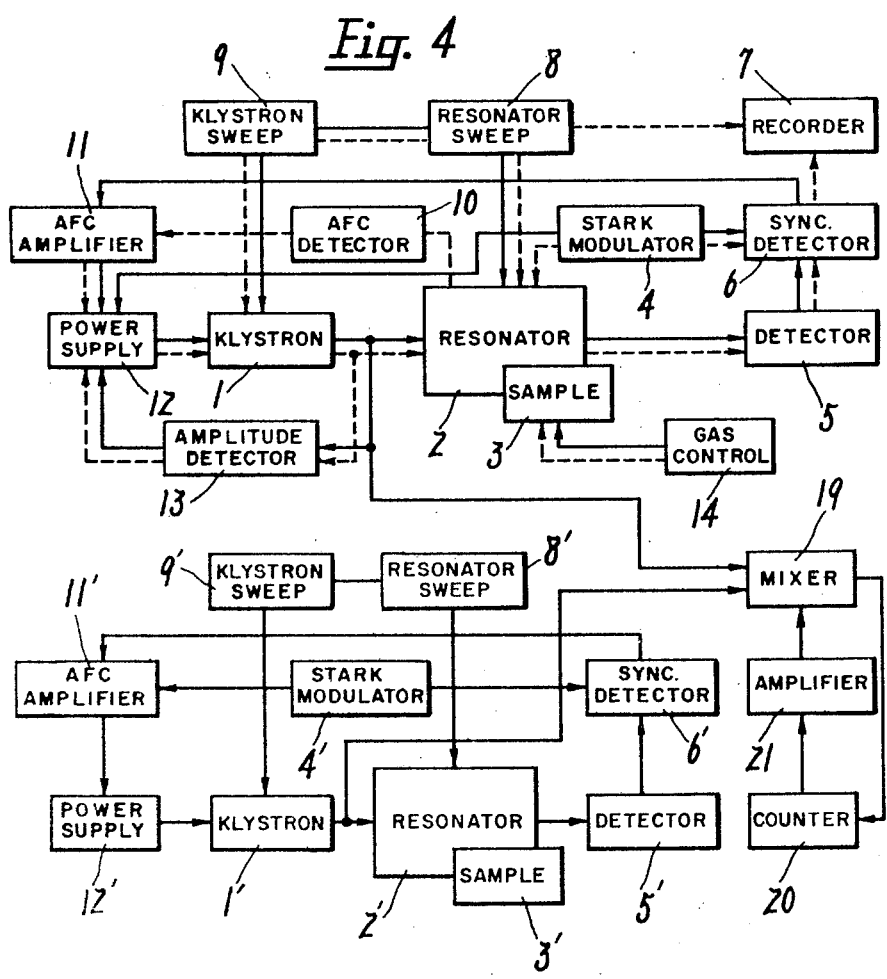
FIGURE 4 is a block diagram showing another apparatus embodying the present invention.

In FIGURE 4 showing a block diagram of a precision type microwave gas spectrometer which is another embodiment of the present invention, the differential wave form of the absorption spectrum of the sample gas can be described in the same manner as in the first embodiment by the signal courses shown by the dotted lines and the position of the frequency of the absorption spectrum of the sample gas can be precisely determined by comparing it with the already correctly known position of the frequency of the absorption spectrum of a standard gas by actuating the signal courses of the solid lines. The case of actuating the signal courses shown by the solid lines shall be explained in the following. The oscillation frequency of the klystron 1 and the resonance frequence of the Fabry-Perot resonator 2 are fixed by operatively connecting the klystron sweeping mechanism 9 and the standard cavity sweeping mechanism 8 respectively near the absorption frequency to be correctly determined.

As in the case of Stark modulation, the microwave output of the Fabry-Perot resonator 2 has as an envelope an alternating current corresponding to the gradient of the variation of the loss Q of the Fabry-Perot resonator 2 by the sample gas. When said alternating current is taken out with the wide range microwave detector 5 and is synchronously detected and amplified in the synchronously detecting low frequency amplifier 6 controlled with the frequency modulating power supply 4, a differential signal of the absorption spectrum will be produced.

Said differential signal is amplified through the frequency controlling amplifier 11 and is then fed back to klystron power supply 12 so that the oscillation frequency of the klystron 1 may be varied. Therefore, in the normal state, that is, when there is no said differential signal, the oscillation frequency of the klystron 1 will perfectly coincide with the absorption frequency to be investigated of the sample gas.

On the other hand, one of the absorption frequencies of the standard gas enclosed in the standard sample cell 3' is selected and the oscillation frequency of the klystron sweep oscillator 1' is made to correctly coincide with said absorption frequency of the standard gas by actuating blocks 1' to 13'. The operation is the same as is explained above and therefore shall not be described. Beats are taken with the oscillation frequencies of said klystron oscillators 1 and 1' as inputs of a microwave mixer 19, an output is taken out of an oscillator of 100 m.c. built in a commercial directly read counter 20 of 100 m.c. has the frequency multiplied in a multiplying turning amplifier 21 of 100 m.c. and is added to the microwave mixer 19 and beats are taken again. Thus the frequency obtained by mutliplying 100 m.c. from the microwave mixer 19 and the frequency difference of the klystron oscillators 1 and 1' are directly read and counted with the directly read counter 20 of 100 m.c. From the frequency obtained by the directly read counting and the number of the multiplication of 100 m.c., how much the absorption frequency of the sample gas is deviated from the absorption frequency of the standard gas is known and the position of the frequency of the absorption spectrum of the sample gas is correctly determined.

Figure 5:
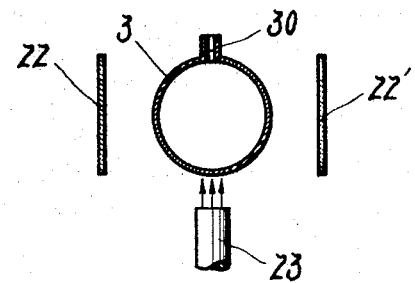
FIGURE 5 is a sectional view taken on line A—A in FIGURE 2 and showing how to subject the sample cell shown in FIGURE 2 to external influences.

FIGURE 5 shows how external conditions are applied to the sample cell used in the apparatus of the present invention. The sample cell 3 explained with reference to FIGURE 2 is transparent, is made of a molten quartz or terephthalic acid polyester having no loss of microwaves and no absorption of gases making it simple to remove and has a hole 30 on the side for replacing the sample gas. The performance of the sample gas is different depending on such external conditions as the light, electric field, magnetic field and radioactive rays. In FIGURE 5, 22 and 22' are Stark electrodes for observing the influence of the electric field and 23 is a device to apply such external conditions as light, electric field, magnetic field and radioactive rays.

Figure 6:
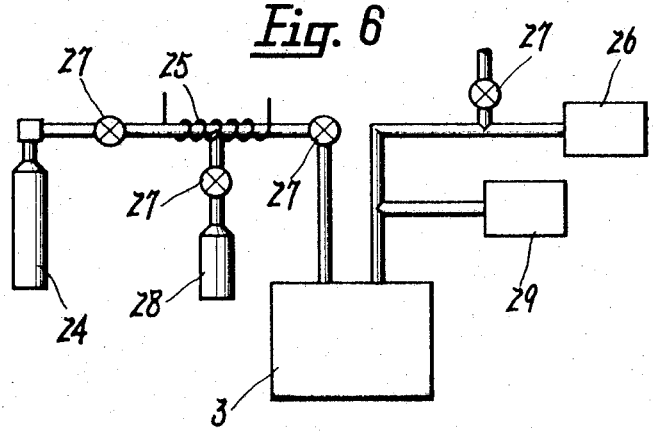
FIGURE 6 is a view of the exhaust system of the sample cell shown in FIGURE 2.

FIGURE 6 shows the exhaust system of the sample cell. In replacing the sample gas, a nitrogen gas in a nitrogen gas container 24 is heated with a heater 25, the sample cell 3 is washed and cleaned and a vacuum degree of about $10^{-3}$ mm. Hg can be obtained by using an ion pump 26 and nongreased cock 27. 28 is a container for the sample gas. 29 is a gauge for measuring the vacuum degree.

According to the present invention, the oscillation frequency of the klystron can be made to correctly follow the resonance frequency of the Fabry-Perot resonator and can be swept over a wide range and therefore a favorable absorption spectrum can be described over a wide range. Further, by the comparison with the theoretically correctly known absorption frequency of a standard gas, the unknown absorption frequency of the sample gas can be precisely determined.

What is claimed is:

1. A wide frequency range scanning microwave gas spectrometer comprising a unit including a Fabry-Perot type cavity resonator composed of a reflector and coupling plates forming a resonance circuit, a mechanical tuning means for changing the resonant frequency of said cavity resonator over a wide frequency range by moving said reflector, a gas cell, containing molecular gas under test, placed between said reflector and coupling plates, a sweep frequency microwave oscillator the output power of which is fed to said Fabry-Perot type cavity resonator, and a servomeans for causing the frequency of said sweep frequency microwave oscillator to follow the resonance frequency of said cavity resonator over a wide frequency range.

2. A spectrometer according to claim 1 comprising a second unit identical to that of the first said unit and a beat frequency counter which determines the frequency difference between two sweep frequency oscillators in said units, whereby the frequency of the sweep frequency oscillator in each unit is adjusted so as to cause coincidence of the frequency of one of the absorption spectrum of gas which is contained in the sample cell in the unit.

3. A spectrometer according to claim 1 comprising a sample cell placed between said reflector and said coupling plates, said cell having transparent side walls and two end plates made of low loss material in the microwave frequency range, said end plates both having low effective microwave reflectivity.

References Cited
UNITED STATES PATENTS

| | | | |
|---|---|---|---|
| 2,212,211 | 8/1940 | Pfund | 324—58.5 X |
| 2,457,673 | 12/1948 | Hershberger | 324—58.5 |
| 2,524,290 | 10/1950 | Hershberger | 324—58.5 |
| 3,165,705 | 1/1965 | Dicke | 324—58.5 X |

RUDOLPH V. ROLINEC, Primary Examiner

P. F. WILLE, Assistant Examiner